United States Patent
Goodyear (10) Patent No.: US 9,810,807 B2
(45) Date of Patent: Nov. 7, 2017

(54) METHODS AND SYSTEMS FOR DETECTING EPITHERMAL AND THERMAL NEUTRONS

(71) Applicant: Halliburton Energy Services, Inc., Houston, TX (US)

(72) Inventor: Grant Goodyear, Spring, TX (US)

(73) Assignee: Halliburton Energy Services, Inc., Houston, TX (US)

(*) Notice: Subject to any disclaimer, the term of this patent is extended or adjusted under 35 U.S.C. 154(b) by 96 days.

(21) Appl. No.: 14/435,100

(22) PCT Filed: Nov. 1, 2012

(86) PCT No.: PCT/US2012/063017
§ 371 (c)(1),
(2) Date: Apr. 10, 2015

(87) PCT Pub. No.: WO2014/070184
PCT Pub. Date: May 8, 2014

(65) Prior Publication Data
US 2015/0276974 A1    Oct. 1, 2015

(51) Int. Cl.
*G01T 3/02* (2006.01)
*G01V 5/10* (2006.01)

(52) U.S. Cl.
CPC ............ *G01V 5/107* (2013.01); *G01T 3/02* (2013.01)

(58) Field of Classification Search
CPC ............ G01V 5/10; G01V 5/107; G01T 3/02
See application file for complete search history.

(56) References Cited

U.S. PATENT DOCUMENTS 3,183,358 A    5/1965    Cooley
3,688,114 A    8/1972    Youmans
(Continued)

FOREIGN PATENT DOCUMENTS

CA    2699706 A1    3/2011

OTHER PUBLICATIONS

Extended Search Report for European Patent Application No. 12887736.2, dated May 9, 2016, 6 pages.
(Continued)

*Primary Examiner* — David Porta
*Assistant Examiner* — Mindy Vu
(74) *Attorney, Agent, or Firm* — Hayes and Boone, LLP (57) ABSTRACT

A system includes a tool for measuring properties of a formation. The tool includes a tool body, a neutron source to emit neutrons disposed within the tool body, a neutron detector disposed within the tool body spaced apart from the neutron source, and a neutron shield arranged in operational relationship to the neutron detector, the neutron shield defines an exterior surface and an interior volume, the neutron shield to prevent neutrons having an energy below a first predetermined threshold from traveling from the exterior surface to the interior volume. The neutron shield is movably coupled to the tool body, wherein the neutron shield defines a non-occluded position relative to the neutron detector such that the neutron detector is at least partially outside the interior volume, and the neutron shield defines an occluded position relative to the neutron detector such that the neutron detector is disposed within the interior volume.

20 Claims, 6 Drawing Sheets

(56) References Cited

U.S. PATENT DOCUMENTS

| | | | |
|---|---|---|---|
| 3,691,384 A * | 9/1972 | Robinson | G01N 23/222 250/261 |
| 4,100,414 A * | 7/1978 | Distenfeld | G01T 3/00 250/337 |
| 5,581,079 A | 12/1996 | Mickael | |
| 2002/0096363 A1 | 7/2002 | Evans et al. | |
| 2005/0051718 A1 | 3/2005 | Ellis et al. | |
| 2006/0226351 A1 | 10/2006 | Stoller et al. | |
| 2009/0045328 A1 | 2/2009 | Fricke et al. | |
| 2009/0283691 A1 | 11/2009 | Stoller | |
| 2010/0230585 A1 | 9/2010 | Zhang et al. | |
| 2011/0272570 A1 | 11/2011 | Xu et al. | |
| 2011/0272590 A1 | 11/2011 | Norris | |
| 2011/0313669 A1 | 12/2011 | Thornton | |

OTHER PUBLICATIONS

Fast and Slow Neutron Detector, Pug-7N, www.drct.com/neutron_detection/Pug-7_Neutron.htm.

International Search Report and The Written Opinion of the International Searching Authority, or the Declaration, dated May 14, 2013, PCT/US2012/063017, 12 pages, International Searching Authority, KR.

Canadian Office Action for Patent Application No. CA 2,889,998, dated Sep. 14, 2006, 6 pages.

Chinese Office Action for Patent Application No. CN 201280076793.4, dated Aug. 30, 2016, 37 pages.

Hong, Youmi, "Logging Principles and Comprehensive Interpretation," Teachng Materials for College Students, Jun. 30, 2008, China Petroleum University Press, $1^{st}$ Edition, pp. 259-267.

\* cited by examiner

METHODS AND SYSTEMS FOR DETECTING EPITHERMAL AND THERMAL NEUTRONS

The present application is a U.S. National Stage patent application of International Patent Application No. PCT/US2012/063017, filed on Jan. 1, 2012, the benefit of which is claimed and the disclosure of which is incorporated herein by reference in its entirety.

CROSS-REFERENCE TO RELATED APPLICATIONS

None.

BACKGROUND

Neutron formation evaluation tools interrogate the formation surrounding the borehole with high energy neutrons produced by a neutron source associated with the tool. Through various types of interactions by the neutrons with elements of the borehole and formation, the energy of some of the neutrons is reduced. Neutron detectors may detect (or "count") neutrons received back from the formation having a particular energy level, for example thermal neutrons.

Neutrons are sensitive to the presence of hydrogen atoms, which are effective at reducing the energy of neutrons to the thermal level. Hydrogen atoms are indicative of formation properties such as porosity, which can thus be determined based on the number of arrivals of thermal neutrons at the neutron detector(s). In particular, a large amount of hydrogen atoms results in more thermal neutrons, which are then detected by the neutron detector. However, the presence in the borehole or formation of certain ions such as halogens, which have a tendency to capture thermal neutrons, reduces the count of neutrons received at the neutron detector. This negatively impacts the accuracy of a porosity calculation based on the number neutrons detected by the neutron detector.

BRIEF DESCRIPTION OF THE DRAWINGS

For a detailed description of exemplary embodiments, reference will now be made, by way of example only, to the accompanying drawings in which.

NOTATION AND NOMENCLATURE

Certain terms are used throughout the following description and claims to refer to particular system components. As one skilled in the art will appreciate, oilfield service companies may refer to a component by different names. This document does not intend to distinguish between components that differ in name but not function.

In the following discussion and in the claims, the terms "including" and comprising" are used in an inclusive fashion, and thus should be interpreted to mean "including, but not limited to . . . ", Also, the term "couple" or "couples" is intended to mean either an indirect or direct connection. Thus, if a first device couples to a second device, that connection may be through a direct connection or through an indirect connection via other devices and connections.

As used here, the term "about" shall mean values within plus or minus five percent (+/−5%) of the recited value.

As used herein, the term "releasing neutrons" shall mean that neutrons travel away from a source of neutrons, but shall not speak to the mechanism by which the neutrons are created (e.g., particle collisions, radioactive decay).

DETAILED DESCRIPTION

The following discussion is directed to various embodiments of the disclosure. Although one or more of these embodiments may be preferred, the embodiments disclosed should not be interpreted, or otherwise used, as limiting the scope of the disclosure, including the claims. In addition, one skilled in the art will understand that the following description has broad application, and the discussion of any embodiment is meant only to be exemplary of that embodiment, and not intended to intimate that the scope of the disclosure, including the claims, is limited to that embodiment.

In accordance with various embodiments, a tool includes a neutron detector and a neutron shield that is movable between an occluded and non-occluded position with respect to the neutron detector. The neutron detectors detects (or "counts") the arrival of thermal neutrons as is known in the art. The neutron shield has an exterior surface and defines an interior volume and, in at least some embodiments, may be of a generally cylindrical shape surrounding the tool. The neutron shield blocks neutrons having an energy below a predetermined energy level from passing through the shield (e.g., from the exterior surface to the interior volume) and permits neutrons having an energy below the predetermined energy level to pass through. The neutron detector is at least partially outside the interior volume of the neutron shield in the non-occluded position; however, the neutron detector is within the interior volume of the neutron shield in the occluded position. Thus, when the neutron shield is in the occluded position, neutrons below an energy threshold, such as thermal neutrons, that are incident on the exterior of the neutron shield are absorbed; however, higher-energy neutrons such as epithermal neutrons incident on the exterior of the neutron shield travel to the interior volume.

In accordance with various embodiments, the neutron shield is constructed such that the energy lost by an epithermal neutron traveling through the shield causes the neutron to become a thermal neutron after traveling through the shield to the interior volume of the shield. In some embodiments, the neutron shield may be constructed from cadmium and may have a thickness of about 2 millimeters or more. Cadmium is transparent to epithermal neutrons but has a very high probability of absorbing thermal neutrons. When the neutron shield is in the non-occluded position, the neutron detector detects thermal neutrons from the borehole and formation, while epithermal neutrons appear as noise and thus are not detected. Thus, when the neutron shield is in the occluded position, the neutron detector detects epithermal neutrons from the borehole and formation because thermal neutrons are blocked from the neutron detector by the neutron shield.

Unlike thermal neutrons, which are susceptible to capture by certain ions (e.g., halogens) present in the borehole or formation, epithermal neutrons are much less likely to be captured. By observing the difference between detected thermal neutrons (i.e., when the neutron shield is in the non-occluded position) and detected epithermal neutrons (i.e., when the neutron shield is in the occluded position), information about halogens such as chlorine in the formation may be determined and subsequently accounted for when determining the porosity of the formation. In other words, by detecting thermal and epithermal neutrons, a richer view of the formation porosity and, in particular, hydrogen atom concentration is available. Further, the negative impact of halogens present in the formation on hydrogen concentration calculations and porosity calculations is mitigated. The various embodiments of the present disclosure are discussed below with respect to the accompanying figures.

Figure 1:
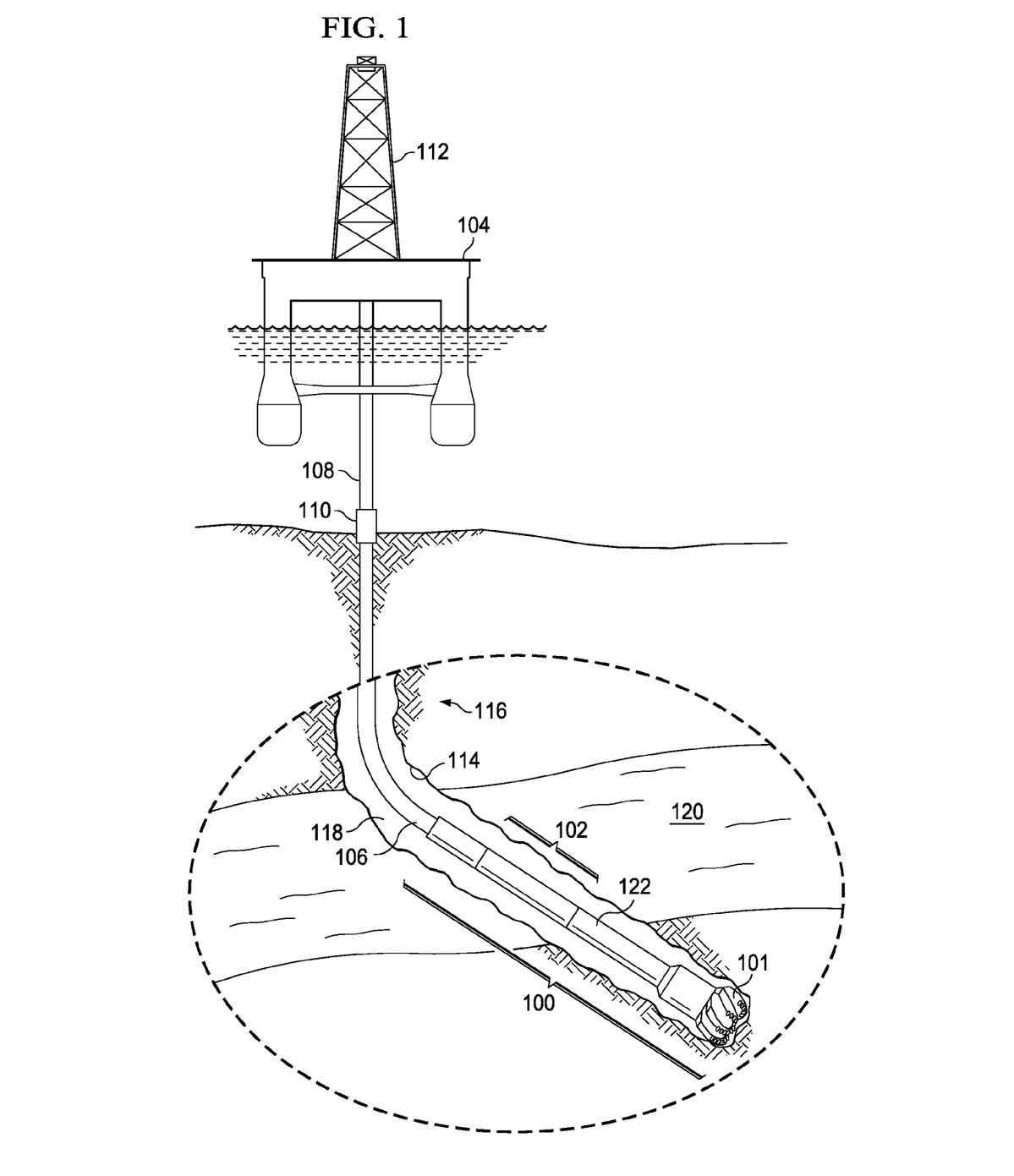
FIG. 1 shows a system in accordance with at least some embodiments.

FIG. 1 shows a bottom hole assembly 100 for a drilling operation, where the bottom hole assembly 100 comprises a pulsed-neutron formation evaluation tool 102 and a drill bit 101. The bottom hole assembly 100 is lowered from a drilling platform 104, such as a ship or other drilling platform, by way of a drill string 106. The drill string 106 extends through a riser 108 and a well head 110. Drilling equipment supported within and around derrick 112 rotates the drill string 106 and the drill bit 101, causing the bit 101 to form a borehole 114 through the formation material 116. The volume defined between the drill string 106 and the borehole 114 is referred to as the annulus 118. The borehole 114 penetrates subterranean zones or reservoirs, such as reservoir 120, believed to contain hydrocarbons in a commercially viable quantity. It is also consistent with the teachings herein that the tool 102 is employed in other bottom hole assemblies and with other drilling apparatus in land-based drilling with land-based platforms, as well as offshore drilling as shown in FIG. 1. In addition to the tool 102, the bottom hole assembly 100 may also contain various other systems, such as a down hole drill motor, a rotary steerable tool, a mud pulse telemetry system, and other measuring-while-drilling and/or logging-while-drilling sensors and systems.

In some embodiments, the information gathered by the tool 102 may be stored within the tool 102 and read when the tool 102 is raised to the surface or the platform 104. In other embodiments, some or all the information gathered by the tool may be sent to the surface or platform 104 while the tool 102 is within the borehole 114. For example, some or all the information gathered by the tool 102 may be sent encoded in pressure pulses in the drilling fluid within the drill string 106. In yet still other embodiments, the information gathered by the tool 102 may be sent over a communication pathway embedded within the pipes of the drill string 106, such as by electrical conductors or optical conductors.

The tool 102 may be coupled within the bottom hole assembly 100 by any suitable mechanism. For example, in some embodiments the tool 102 has a threaded male "pin" end connector on one end, and a threaded female "box" end connector on the other end, such that the tool 102 couples to other components of the bottom hole assembly 100. At least a portion of the outer surface 122 forms a pressure vessel within which various components for generating neutrons, detecting neutrons, and detecting gammas are located. Moreover, a fluid conduit (not visible in FIG. 1) may also reside within the outer surface 122, and drilling fluid passes through the fluid conduit on its journey to the drill bit 101.

Figure 2:
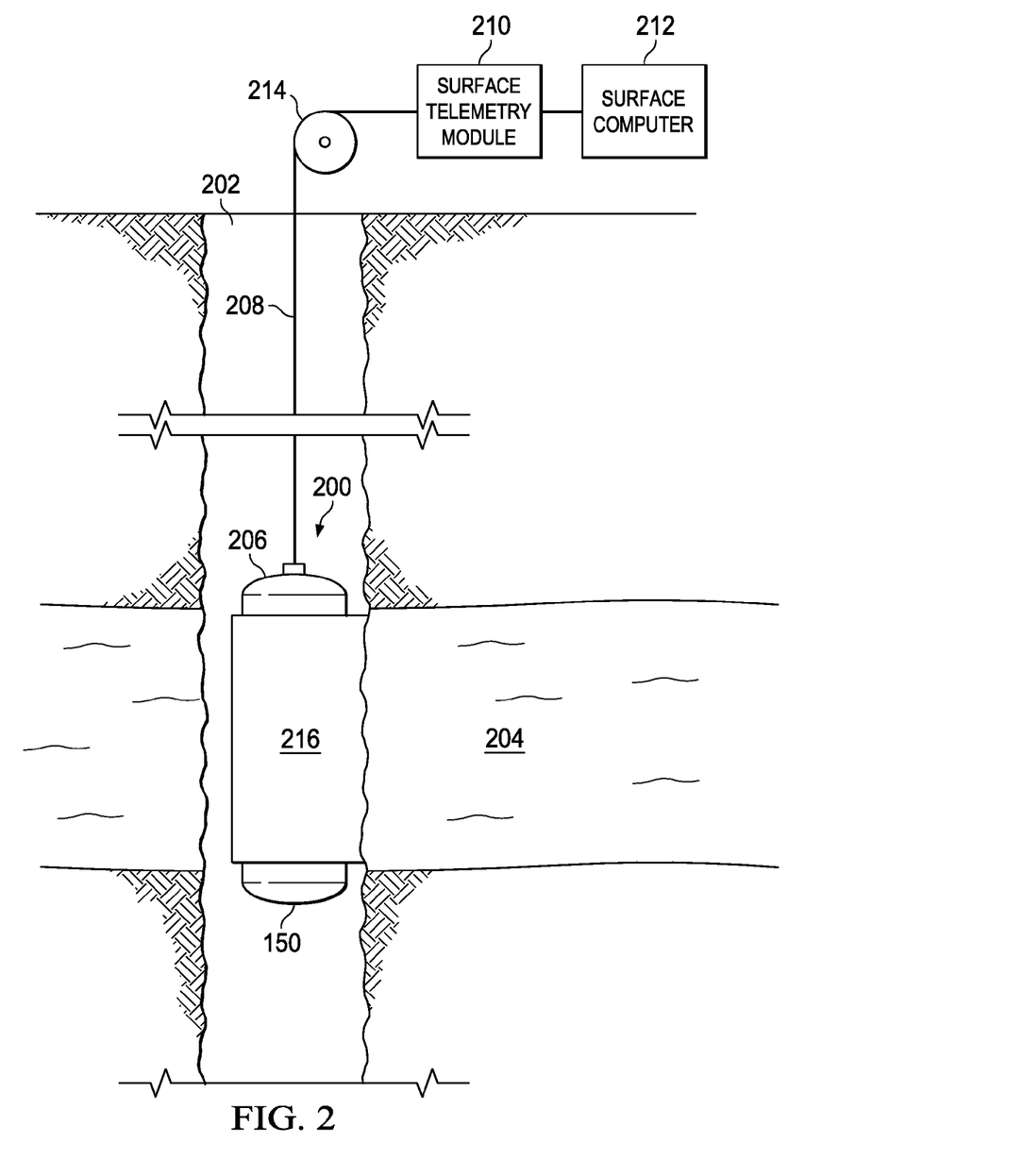
FIG. 2 shows a system in accordance with at least some embodiments.

While in some embodiments the formation evaluation tool is used in drilling operations, in yet still other embodiments the formation evaluation tool is used in wireline logging operations. In particular, FIG. 2 illustrates a wireline logging system that comprises a logging tool 200 placed within a borehole 202 proximate to a formation 204 of interest. The tool 200 may comprise a pressure vessel 206 within which various subsystems of the tool 200 reside, and in the illustrative case of FIG. 2 the pressure vessel 206 is suspended within the borehole 202 by a cable 208. Cable 208, in some embodiments a multi-conductor armored cable, not only provides support for the pressure vessel 206, but also in these embodiments communicatively couples the tool 200 to a surface telemetry module 210 and a surface computer 212. The tool 200 may be raised and lowered within the borehole 202 by way of the cable 208, and the depth of the tool 200 within the borehole 202 may be determined by depth measurement system 214 (illustrated as a depth wheel). Depending on the application, the pressure vessel 206 may be covered with a thermal neutron absorptive material 216 (the thickness of which is exaggerated for clarity of the figure); however, in many embodiments where neutron detection is of principal importance, the material 216 may be only partially present or omitted altogether.

Figure 3A:
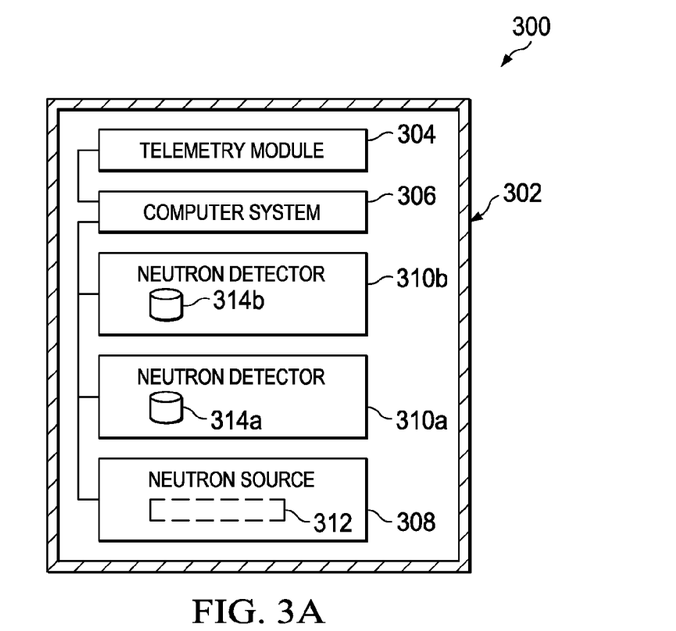
FIGS. 3a-3c shows a simplified cross-sectional view of a logging tool including a neutron detector and a neutron shield in accordance with at least some embodiments.

FIG. 3a shows a simplified partial cross-sectional view of a logging tool 300 in accordance with at least some embodiments. Logging tool 300 is illustrative of either tool 102 in bottom hole assembly 100 or wireline tool 200. In particular, FIG. 3 illustrates a pressure vessel 302 that seals the various internal components from contact with borehole fluids and pressures. Within the pressure vessel 302 illustratively reside a telemetry module 304, computer system 306, a neutron source 308, and near and far neutron detectors 310a, 310b. As shown, the neutron detectors 310 are positioned above the neutron source 308; however, this orientation may be reversed in some embodiments.

In some embodiments the neutron source 308 is a Deuterium/Tritium neutron generator. However, any neutron source capable of producing and/or releasing neutrons may equivalently be used. The neutron source 308, under command from surface computer system 212 (FIG. 2, in the case of wireline tools), or under command from computer system 306 within the tool (in the case of measuring-while-drilling (MWD), logging-while-drilling (LWD) or slickline tools), generates and/or releases energetic neutrons. In the particular case of a Deuterium/Tritium neutron generator, the neutrons are generated based on ions of Deuterium accelerated into collisions with a target 312 (shown in dashed lines, as the target would be within a sealed chamber) coated with Tritium. Alternatively, Tritium ions may be accelerated onto a Deuterium coated target. The collisions fuse the particles creating Helium and a neutron having energy of 14.2 Mega-electron Volts (MeV). Neutrons generated by particle collision with target 312 propagate outward randomly in all directions, and thus the target 312 may be considered a point of emanation of the neutrons produced.

Neutrons produced by the source 308 interact with atoms by way of collisions (e.g., elastic or inelastic) and/or thermal capture. In the case of collisions, a neutron collides with atomic nuclei and the energy of the neutron is reduced. The neutron may have many collisions with the atomic nuclei, each time losing energy. After one or more collisions (and corresponding loss of energy) a neutron reaches an energy known as epithermal energy (i.e., an epithermal neutron). Subsequently, after further collisions, the neutron reaches an energy known as thermal energy (i.e., a thermal neutron). At thermal energy a neutron is much more likely to be captured by atomic nuclei than an epithermal neutron would be.

In accordance with at least some embodiments, the neutron detector 310 is a sealed chamber Helium-3 detector. In this type of detector, neutrons are detected by their interactions with Helium-3 in the pressure housing 314 of the neutron detector 310. In at least some embodiments, the near detector 310a is located within about one foot from the neutron source 308 and the far detector 310b is located between two to three feet from the neutron source 308. Formation or borehole properties such as porosity may be determined based on the ratio of neutrons detected at the near detector 310a to the neutrons detected at the far detector 310b.

As explained above, determination of formation porosity based on neutron detection relies on the fact that neutrons are sensitive to the presence of hydrogen atoms because of their ability reduce the energy of neutrons to the thermal level. Additionally, the quantity of hydrogen atoms present is a good indicator of formation porosity. However, the presence in the borehole or formation of certain ions such as halogens, which have a tendency to capture thermal neutrons, means the neutron detector 310 detects fewer neutrons and thus the presence of hydrogen atoms is calculated to be lower. Thus, the true hydrogen atom concentration and associated formation properties become more difficult to accurately calculate.

Figure 3B:
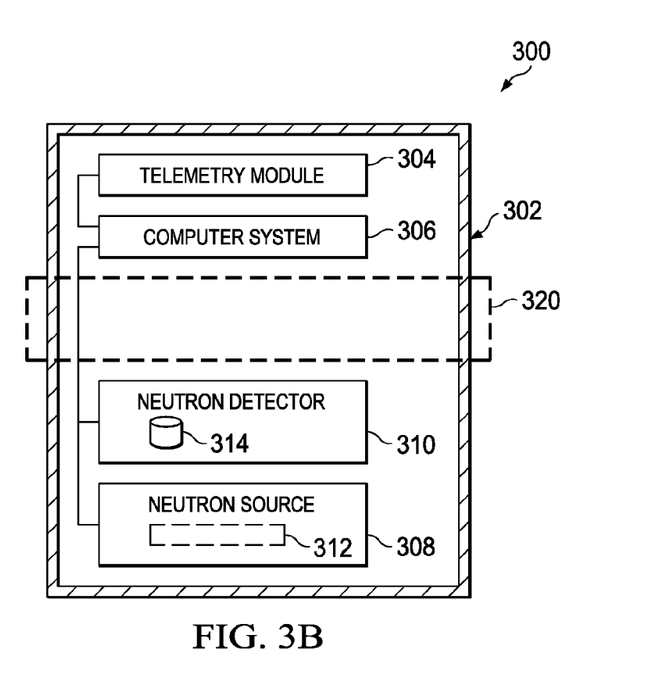

Turning now to FIG. 3b, a neutron shield 320 is shown in an operational relationship to the neutron detector 310 and, in particular, is shown in a non-occluded position with respect to the neutron detector 310. In FIG. 3b, only one neutron detector 310 is shown for simplicity; however, as in FIG. 3a, a near and far neutron detector may be present in certain embodiments. The neutron shield 320 has an exterior surface that faces outward (i.e., toward the formation) and defines an interior volume, which includes the tool 300 and the area inside the neutron shield 320. In some embodiments, the neutron shield 320 is generally cylindrical in shape and has a height great enough to occlude the neutron detector when moved to an occluded position.

The neutron shield 320 blocks neutrons having an energy below a predetermined value from passing through. The neutron detector 310 is at least partially outside the interior volume of the neutron shield 320 in the non-occluded position; however, the neutron detector 310 is within the interior volume of the neutron shield 320 in the occluded position. Thus, when the neutron shield 320 is in the occluded position, thermal neutrons incident on the exterior of the neutron shield 320 are absorbed; however, higher-energy neutrons such as epithermal neutrons incident on the exterior of the neutron shield 320 travel to the interior volume.

Figure 3C:
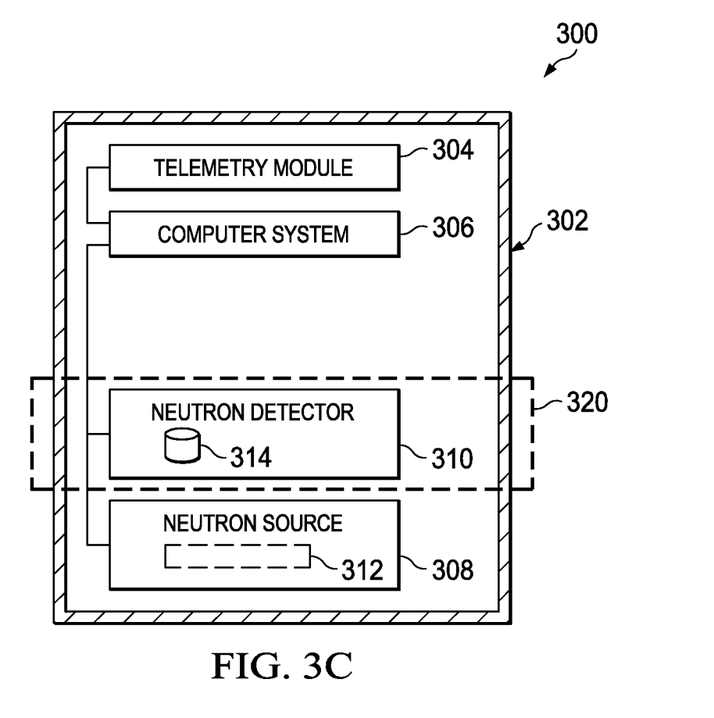

FIG. 3c shows the neutron shield 320 in the occluded position, where the neutron detector 310 is occluded by the neutron shield 320 and is disposed within the interior volume of the neutron shield 320. The neutron shield 320 may be actuated by a motor to axially translate along the tool 300 to move between the occluded and non-occluded positions. As above, only one neutron detector 310 is shown for simplicity. In embodiments where both a near and far detector 310a, 310b are included, one neutron shield may be used to occlude both detectors (i.e., both detectors are disposed within the interior volume of the neutron shield 320 when in the occluded position). In other embodiments where both a near and far detector 310a, 310b are included, a separate neutron shield may be used to occlude each detector (i.e., detector 310a is disposed within a first neutron shield when in the occluded position and detector 310b is disposed within a second neutron shield when in the occluded position).

In accordance with various embodiments, the neutron shield 320 is constructed such any thermal neutron incident upon the exterior surface of the shield 320 is blocked from traveling to the interior volume of the shield 320. In some embodiments, the neutron shield may be constructed from cadmium and may have a thickness of about 2 millimeters. When the neutron shield 320 is in the non-occluded position, the neutron detector 310 detects thermal neutrons from the borehole and formation, while epithermal neutrons appear as noise and thus are not detected. Thus, when the neutron shield 320 is in the occluded position, the neutron detector 310 detects epithermal neutrons from the borehole and formation because thermal neutrons are blocked from the neutron detector 310 by the neutron shield 320. As explained above, epithermal neutrons are less likely to be captured by certain ions (e.g., halogens) present in the borehole or formation. By observing the difference between detected thermal neutrons (i.e., when the neutron shield 320 is in the non-occluded position) and detected epithermal neutrons (i.e., when the neutron shield 320 is in the occluded position), information about halogen ions such as chlorine (e.g., resulting from the presence of salt water) in the formation may be determined and subsequently accounted for when determining the porosity of the formation. In other words, by detecting thermal and epithermal neutrons, a richer view of the formation porosity and, in particular, hydrogen atom concentration is available. Further, the negative impact of halogens present in the formation on hydrogen concentration calculations and porosity calculations is mitigated.

Although not depicted in FIGS. 3b and 3c, in some embodiments, a second neutron shield also having an exterior surface and an interior volume is in an operational relationship with respect to the neutron detector 310. The second neutron shield similarly blocks neutrons having an energy below a second predetermined value from passing through. In embodiments where more than one neutron shield is in an operable relationship with respect to the neutron detector 310, the energy level of neutrons allowed to pass through to the neutron detector 310 and be thermal neutrons within the interior volume is able to be more specifically tailored. For example, by moving one shield to the occluded position, neutrons having an energy above a first threshold are detected within the interior volume. Then, by moving the other shield to the occluded position, neutrons having an energy above a second threshold are instead detected within the interior volume. Further, in some embodiments, the neutron shields may be arranged concentrically such that the combination of shields enables neutrons having an energy above the highest threshold are detected within the interior volume. By enabling neutrons of different energy levels to be detected by the neutron detector 310, spectral information regarding neutrons that interact with the formation may be determined. Other similar combinations of neutron shields are within the scope of the present disclosure.

Figure 4A:
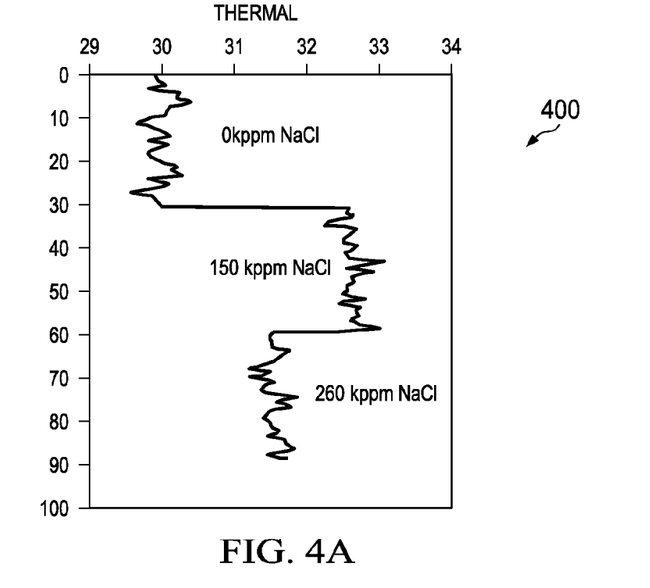
FIGS. 4a-4b show example formation porosity-versus-depth graphs in accordance with various embodiments.
Figure 4B:
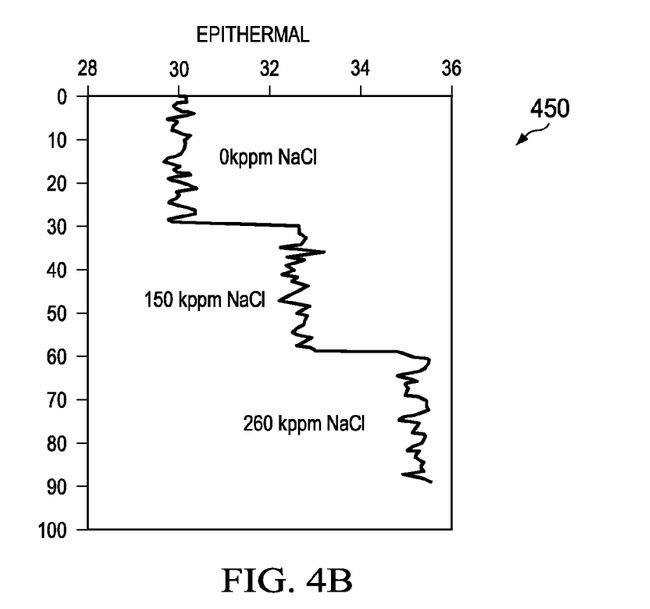

FIGS. 4a and 4b show example porosity-versus-depth graphs 400, 450 in accordance with various embodiments. Although the graphs 400, 450 depict porosity units, one skilled in the art will understand that such units may be determined based on knowledge of hydrogen atom concentration. As explained above, hydrogen atom concentration may be determined using neutron detection, for example a ratio of neutrons detected at a near detector 310a to neutrons detected at a far detector 310b.

In the graph 400, the neutron shield 320 is in the non-occluded position and thus the neutron detector 310 detects thermal neutrons incident upon it from the surrounding formation. In this particular example, for the first 30 feet, porosity is relatively constant around 30 porosity units and there is no NaCl present in the formation.

Then, between 30 and 60 feet, NaCl (e.g., in the form of salt water) is introduced to the formation at a level of about 150 kppm; however, the porosity of the formation also increases. In this particular case, the net effect of increased hydrogen atoms and increased chlorine ions is still a detected increase in formation porosity; that is, the presence of chlorine ions is not so great that enough neutrons are captured to counterbalance the increased number of thermal neutrons as a result of the increased hydrogen atom concentration. However, as will be explained in further detail below, the presence of chlorine ions still affects the detection of neutrons and subsequent calculations of hydrogen atom concentration and formation porosity.

Between 60 and 90 feet, NaCl is increased in the formation to a level of about 260 kppm, corresponding to levels associated with saturated salt water. In the graph 400, porosity appears to be reduced to between 31-32 porosity units and, without further context, an operator would believe that a reduction in formation porosity has occurred at a depth of between 60-90 feet.

In the graph 450 shown in FIG. 4b, the neutron shield 320 is in the occluded position and thus the neutron detector 310 detects epithermal neutrons within the interior volume of the neutron shield 320. As shown, the first 60 feet of depth appear relatively the same as in FIG. 4a, resulting from the fact that the concentration of chlorine ions is generally not high enough to render the calculation of formation porosity inaccurate. However, between 60-90 feet, where the porosity appeared to decrease to about 31-32 porosity units in the graph 400, the determined porosity actually increases to about 35 porosity units in the graph 450.

The graph 450 shows the result of detecting epithermal neutrons (reduced to thermal energy levels by the neutron shield 320), which are not susceptible to capture by, for example, chlorine ions. Thus, by detecting spectral information of the neutrons released into the formation, a richer and more accurate view of formation properties such as porosity is attained.

Figure 5:
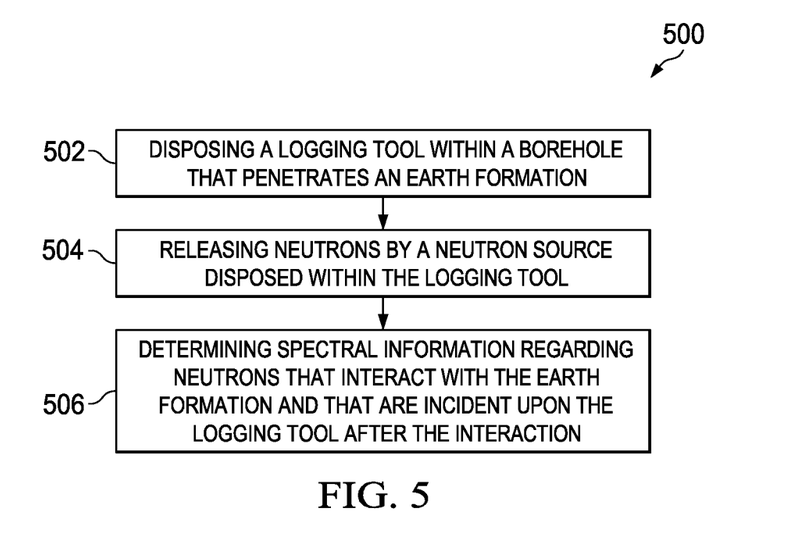
FIG. 5 shows a method in accordance with at least some embodiments.

FIG. 5 shows a method 500 (which, in some embodiments, may be partially implemented by software) in accordance with at least some embodiments. The method 500 begins in block 502 with disposing a logging tool within a borehole that penetrates an earth formation. The method 500 then continues in block 504 with releasing neutrons by a neutron source disposed within the logging tool. Finally, the method 500 includes determining spectral information regarding neutrons that interact with the earth formation that are incident upon the logging tool after the interaction. As explained above, spectral information regarding neutrons may be determined by the neutron detector 310 detecting thermal neutrons when the neutron shield 320 is in the non-occluded position and detecting epithermal neutrons when the neutron shield 320 is in the occluded position. By enabling such spectral detection of neutrons, inaccuracies resulting from the presence of, for example, halogens that capture thermal neutrons are reduced, since epithermal neutrons are not similarly captured.

Figure 6:
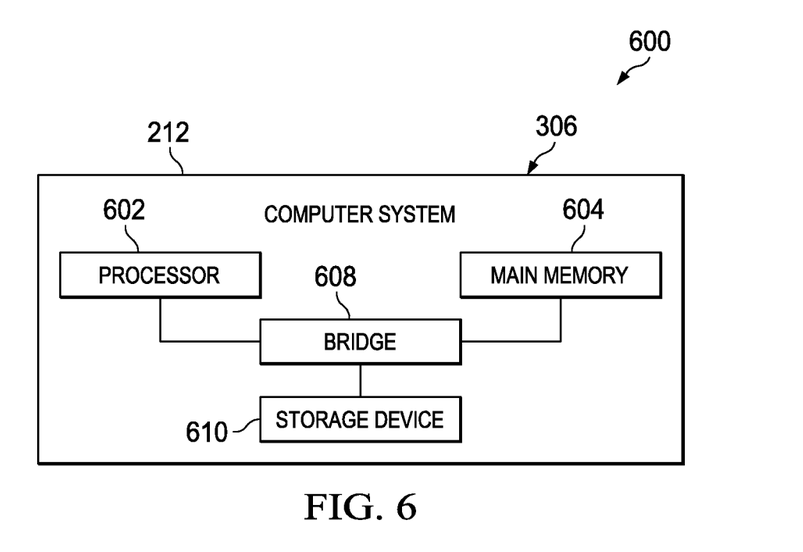
FIG. 6 shows a computer system in accordance with at least some embodiments.

FIG. 6 illustrates in greater detail a computer system 600, which is illustrative of both the surface computer system 212 and the computer system 306. Thus, the computer system 600 described with respect to FIG. 6 could be proximate to the borehole during the time period within which the tool is within the borehole (such as for wireline tools), the computer system 600 could be located at the central office of the oilfield services company, or the computer system 600 could be within the logging tool (such as for LWD, MWD or slickline tools). The computer system 600 comprises a processor 602, and the processor couples to a main memory 604 by way of a bridge device 608. Moreover, the processor 602 may couple to a long term storage device 610 (e.g., a hard drive) by way of the bridge device 608. Programs executable by the processor 6020 may be stored on the storage device 610, and accessed when needed by the processor 602. The program stored on the storage device 610 may comprise programs to implement the various embodiments of the present specification, including programs to create counts of neutrons created by the neutron detector, create an indication of the number of neutrons produced by the neutron source, and to determine a parameter of the formation based on neutron detection rates, which may include both thermal neutrons (i.e., when the neutron shield 320 is in the non-occluded position) and epithermal neutrons (i.e., when the neutron shield 320 is in the occluded position). In some cases, the programs are copied from the storage device 610 to the main memory 604, and the programs are executed from the main memory 604. Thus, both the main memory 604 and storage device 610 are considered computer-readable storage media. The parameters of the formation calculated by the computer system 600 may be sent to a plotter that creates a paper-log, or the values may be sent to a display device which may make a representation of the log for viewing by a geologist or other person skilled in the art of interpreting such logs.

From the description provided herein, those skilled in the art are readily able to combine software created as described with appropriate general-purpose or special-purpose computer hardware to create a computer system and/or computer sub-components in accordance with the various embodiments, to create a computer system and/or computer sub-components for carrying out the methods of the various embodiments and/or to create a non-transitory computer-readable media (i.e., not a carrier wave) that stores a software program to implement the method aspects of the various embodiments.

The above discussion is meant to be illustrative of the principles and various embodiments of the present disclosure. Numerous variations and modifications will become apparent to those skilled in the art once the above disclosure is fully appreciated. It is intended that the following claims be interpreted to embrace all such variations and modifications.

What is claimed is:

1. A system comprising:
    a tool for measuring properties of an earth formation, the tool comprising:
        a tool body;
        a neutron source disposed within the tool body, the neutron source to emit neutrons;
        a neutron detector disposed within the tool body at a spaced apart location from the neutron source;
        a first neutron shield arranged in operational relationship to the neutron detector, the first neutron shield defines an exterior surface and an interior volume, the first neutron shield to prevent neutrons having an energy below a first predetermined threshold from traveling from the exterior surface to the interior volume;

the first neutron shield movably coupled to the tool body, wherein the first neutron shield defines a non-occluded position relative to the neutron detector such that the neutron detector is at least partially outside the interior volume, and the first neutron shield defines an occluded position relative to the first neutron detector such that the first neutron detector is disposed within the interior volume.

2. The system of claim 1 wherein the first neutron shield is to absorb thermal neutrons incident upon the first neutron shield and the first neutron shield is to allow epithermal neutrons outside the exterior surface and incident upon the first neutron shield to travel to the interior volume.

3. The system of claim 2 wherein the first neutron shield is to absorb neutrons having an energy below about 1 electron volt at time of incidence upon the first neutron shield.

4. The system of claim 1 wherein the neutron detector is to detect thermal neutrons incident upon the neutron detector from beyond the exterior surface when the first neutron shield is in the non-occluded position.

5. The system of claim 4 wherein the neutron detector is to detect epithermal neutrons incident upon the exterior surface of the first neutron shield and does not detect thermal neutrons incident upon the exterior surface of the first neutron shield when the first neutron shield is in the occluded position.

6. The system of claim 5 wherein when the neutron detector detects the epithermal neutrons incident upon the exterior surface, the neutron detector is to detect the epithermal neutrons within the interior volume.

7. The system of claim 1 wherein the neutron detector is to detect epithermal neutrons incident upon the exterior surface of the first neutron shield and does not detect thermal neutrons incident upon the exterior surface of the first neutron shield when the first neutron shield is in the occluded position.

8. The system of claim 7 wherein when the neutron detector detects the epithermal neutrons incident upon the exterior surface, the neutron detector is to detect the epithermal neutrons within the interior volume.

9. The system of claim 1 wherein the neutron detector is a near neutron detector and the tool further comprises:
a far neutron detector disposed within the tool body at a spaced apart location from the neutron source farther than the near neutron detector; and
a second neutron shield arranged in operational relationship to the far neutron detector, the second neutron shield defines an exterior surface and an interior volume, the second neutron shield to prevent neutrons having an energy below a second predetermined threshold from traveling from the exterior surface to the interior volume of the second neutron shield;
the second neutron shield movably coupled to the tool body, wherein the second neutron shield defines a non-occluded position relative to the far neutron detector such that the far neutron detector is at least partially outside the interior volume of the second neutron shield, and the second neutron shield defines an occluded position relative to the far neutron detector such that the far neutron detector is disposed within the interior volume.

10. The system of claim 1 further comprising:
a second neutron shield in operational relationship to the neutron detector and the first neutron shield, the second neutron shield defines an exterior surface and an interior volume, the second neutron shield to prevent neutrons having an energy below a second predetermined threshold from traveling from the exterior surface to the interior volume of the second neutron shield;
the second neutron shield movably coupled to the tool body, wherein the second neutron shield defines a non-occluded position relative to the neutron detector such that the neutron detector is at least partially outside the interior volume of the second neutron shield, and the second neutron shield defines an occluded position relative to the neutron detector such that the neutron detector is disposed within the interior volume.

11. The system of claim 10 wherein, in the occluded position of the second neutron shield the neutron detector is within the interior volume of both the first and second neutron shields.

12. The system of claim 1 wherein the tool body further comprises a wireline logging pressure vessel.

13. The system of claim 1 wherein the tool body is a logging-while-drilling tool.

14. The system of claim 1 wherein the first neutron shield is cadmium.

15. A method for measuring properties of an earth formation, the method comprising:
disposing a logging tool within a borehole, wherein the borehole penetrates the earth formation;
releasing neutrons by a neutron source disposed within the logging tool, the neutrons interacting with the earth formation;
detecting the neutrons at a neutron detector of the logging tool, the neutron detector being disposed outside a first neutron shield;
moving the first neutron shield relative to the neutron detector such that the neutron detector is occluded by the first neutron shield; and
detecting the neutrons that reach the neutron detector through the first neutron shield, whereby spectral information regarding the neutrons is determined.

16. The method of claim 15 wherein neutrons having energy below a first predetermined threshold are absorbed by the first neutron shield.

17. The method of claim 15 wherein neutrons having energy below about 1 electron volt are absorbed by the first neutron shield.

18. The method of claim 15 wherein neutrons having energy below a second predetermined threshold, higher than the first predetermined threshold, are selectively blocked from reaching the neutron detector disposed in the logging tool.

19. The method of claim 15 further comprising:
moving a second neutron shield relative to the neutron detector such that the neutron detector is occluded by the second neutron shield; and
detecting neutrons that reach the neutron detector through the second neutron shield.

20. The method of claim 15 further comprising:
moving a second neutron shield relative to the neutron detector and first neutron shield such that the neutron detector is occluded by the first and the second neutron shield; and
detecting neutrons that reach the neutron detector through the first and second neutron shields.

* * * * *